United States Patent

Erdmann-Jesnitzer et al.

[15] 3,673,377
[45] June 27, 1972

[54] APPARATUS AND METHOD FOR CONTROLLING OR MONITORING ELECTRIC WELDING PROCESSES

[72] Inventors: Friedrich Erdmann-Jesnitzer, Hannover-Linden; Dietrich Rehfeldt, Hannover-Vinnhorst, both of Germany

[73] Assignee: Redemat S.A., Luxembourg-Ville, Luxembourg

[22] Filed: Sept. 18, 1969

[21] Appl. No.: 859,021

[30] Foreign Application Priority Data
Nov. 2, 1968  Germany ....................... P 18 06 648.3

[52] U.S. Cl. .......................................... 219/131 R, 219/137
[51] Int. Cl. ........................................................... B23k 9/10
[58] Field of Search ................. 219/137, 131, 130, 110, 109, 219/125

[56] References Cited

UNITED STATES PATENTS

| | | | |
|---|---|---|---|
| 1,979,786 | 11/1934 | Andrus | 219/109 |
| 2,093,982 | 9/1937 | Ragsdale et al. | 219/109 X |
| 2,101,108 | 12/1937 | Tarbox | 219/109 X |
| 3,250,894 | 5/1966 | Manz | 219/131 |
| 3,370,151 | 2/1968 | Normando | 219/12 S X |
| 3,433,921 | 3/1969 | Peterson | 219/110 |

*Primary Examiner*—J. V. Truhe
*Assistant Examiner*—George A. Montanye
*Attorney*—John J. Dennemeyer

[57] ABSTRACT

A method and apparatus for controlling or monitoring electric arc welding processes by analyzing an input signal derived from a welding parameter by means of a transducer. This input signal is analyzed with respect to its amplitude, duration and occurrence frequency during a preselected period and an error signal is generated to indicate the error or defect at the seam which is welded and to drive the welding apparatus toward the correct adjustment.

2 Claims, 3 Drawing Figures

APPARATUS AND METHOD FOR CONTROLLING OR MONITORING ELECTRIC WELDING PROCESSES

The invention relates to the field of electric welding and concerns more particularly a method for monitoring, controlling or regulating the course of an electric arc welding process as well as the apparatus for carrying out this method.

It is known that the electrode filler material in electric arc welding processes melts off in the form of drops and that during the melting off and the transfer of the drops characteristic welding voltage variations occur as a function of time. This is described for example in German Pat. No. 828571.

Accordingly, there is a fixed relation between determined pulse shaped welding voltage variations if sufficient magnitude and the transfer of molten electrode filler material for specifically advantageously adjusted welding operation parameters, such as welding voltage, welding current, welding rate etc. Likewise disturbances in the course of the welding process also produce characteristic welding voltage variations through their influence on the transfer of the material.

For example, an irregular advance of the filler material produces, by the lengthening or the shortening of the electric arc, important variations in the mean value of the welding voltage, respectively of the welding current as a function of time.

With the integrating measuring instruments for welding current and voltage, commonly used and incorporated in the welding sets, these disturbances either cannot be covered or only conditionally due to the desired high inertia of the measuring instruments.

These considerations are accordingly to be extended to all other welding processes with or without electric arc, for which the melting and the melting-off of the filler material or the melting of the base material cause characteristic temporary variations of the welding voltage or the welding current.

It has been shown by metallographic and strength tests that the defect and failure probability is essentially greater in welding seam areas for which an irregularity in the transfer of the material, respectively during the melting, could be observed, than for those produced with a regular transfer of the material, respectively with a regular melting of the filler material or of the base material.

The object of the present invention is to provide a method as well as an apparatus for carrying out the method, with which the above disadvantages are registered and stored for later processing.

According to the invention, the problem is solved in that during the welding operation the welding voltage, which must be within adjustable ranges, preferably with respect to magnitude, duration and pulse frequency so that the weld can be considered as being undisturbed, is analyzed in such a manner that a disturbance signal is given in case the welding voltage is not within the preset ranges.

A further object of the invention is to provide an apparatus for carrying out the above method.

With this method it is thus possible to locate and mark the weld areas for which the defect or failure probability is great; the commonly used, non-destructive material testing methods, such as X-ray testing, ultrasonic testing etc., can be limited thereby to these areas or must be carried out especially carefully in these areas.

In this manner the relatively expensive testing methods can be utilized more advantageously. The shape of a weld which is to be performed uniformly is characterized preferably by the thermal uniformity during the melting of the electrode travelling relative to the work piece which uniformity is desired but which may also be disturbed.

The invention will now be described by way of example with reference to the accompanying drawings wherein FIGS. 1 and 2 are voltage-time diagrams of the welding voltage and of the disturbance signal and FIG. 3 shows a preferred embodiment of the invention.

In electric welding particularly the following three disturbances may be observed. Their effects influence the welding seam in such a manner that the failure probability is greater in comparison with a seam welded with welding parameters which have been correctly adjusted with regard to the quality of the seam to be produced.

A first disturbance, the so-called "sticking" of the electrode filler material, is characterized, in comparison with the normal transfer of the material under short-circuit formation, by an essentially longer short circuit of the welding voltage; this occurs for example at an excessively low mean welding voltage.

A further disturbance of the normal melting and melting off behavior, the so-called "breaking" of the arc, such as in the electro-slag welding process, is characterized in comparison with the normal arc-back peak after the transfer of the drops, by an essentially longer lasting ascent of the welding voltage to the magnitude of the open-circuit voltage of the welding power source, which occurs for example during an intermittent advance of the electrode filler material. A third disturbance of the normal melting and melting off behavior is characterized in that with regard to the welding process or the type of electrode an excessively big drop is formed, which, without passing into the fusion bath, causes several times briefly a short-circuit of the welding voltage by "tipping" and passes only thereafter into the fusion bath. The oscillogram of the welding voltage shows several characteristic short time welding voltage breakdowns within a short period of time which may be predetermined and which occur for example in the welding with medium to fine drop electrodes at an excessively low mean welding voltage, respectively an excessively low welding current.

Figure 1:
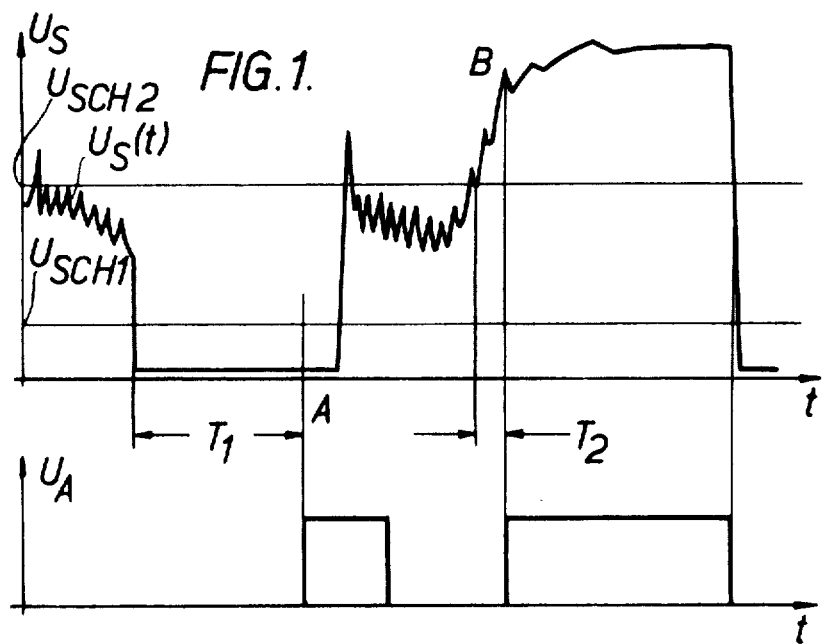
FIG. 1 is a voltage-time diagram of the welding voltage and of the disturbance signal upon exceeding or falling below the pre-set welding voltage limits and times, the so-called "sticking" or "breaking."
Figure 2:
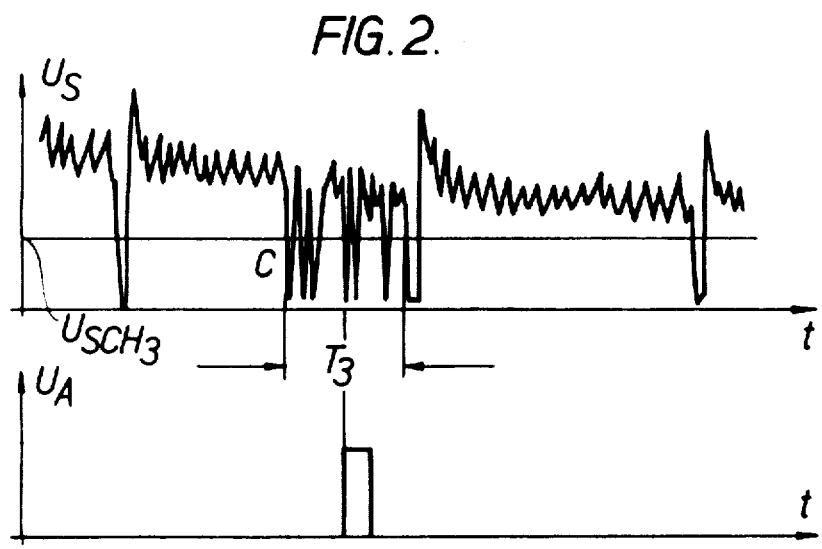
FIG. 2 is a voltage-time diagram of the welding voltage and of the disturbance signal in the case of a repeated occurrence of short welding voltage breaks within a pre-set time $T_3$, the so-called "tipping."

The voltage curve of the welding voltage for these three disturbances is shown in FIGS. 1 and 2, the "sticking" being shown at A, the "breaking" at B and the "tipping" at C.

The following three defect criteria may be derived from the above described disturbances:

A defect or error, respectively a disturbance in the course of the welding process is the residence time of the welding voltage $U_s(t)$ in FIG. 1 below an adjustable threshold voltage $U_{SCH1}$ and in which the residence time is longer than an adjustable time $T_1$ (detail A in FIG. 1).

A further defect or error, respectively a disturbance in the course of the welding process is the residence time of the welding voltage above an adjustable threshold voltage $U_{SCH2}$ and in which the residence time is longer than an adjustable time $T_2$ (detail B in FIG. 1).

Moreover, a defect or error, respectively disturbance, in the course of the welding process is the repeated (three-, four-, five times etc., the number being adjustable) brief residence time of the welding voltage below an adjustable threshold voltage $U_{SCH3}$ within an adjustable time $T_3$ (detail, C in FIG. 2).

From these defect or error criteria the following requirements are made of the automatically working electronic control apparatus.

An output signal (defect message) $U_A$ in FIGS. 1, 2 should cause the so-called marking device, e.g. an electro-magnetically operated color stamp or an appropriate color spraying device, to provide a lasting mark beside the welding seam and/or on a special recording tape if one of the three above mentioned defect or error criteria occurs, i.e. if the welding voltage remains longer than the pre-selected time below the set threshold voltage $U_{SCH1}$, or if the welding voltage remains longer than the pre-selected time above the threshold voltage $U_{SCH2}$, or if within a preselected time the welding voltage falls more frequently than preselected below the threshold voltage $U_{SCH3}$.

Figure 3:
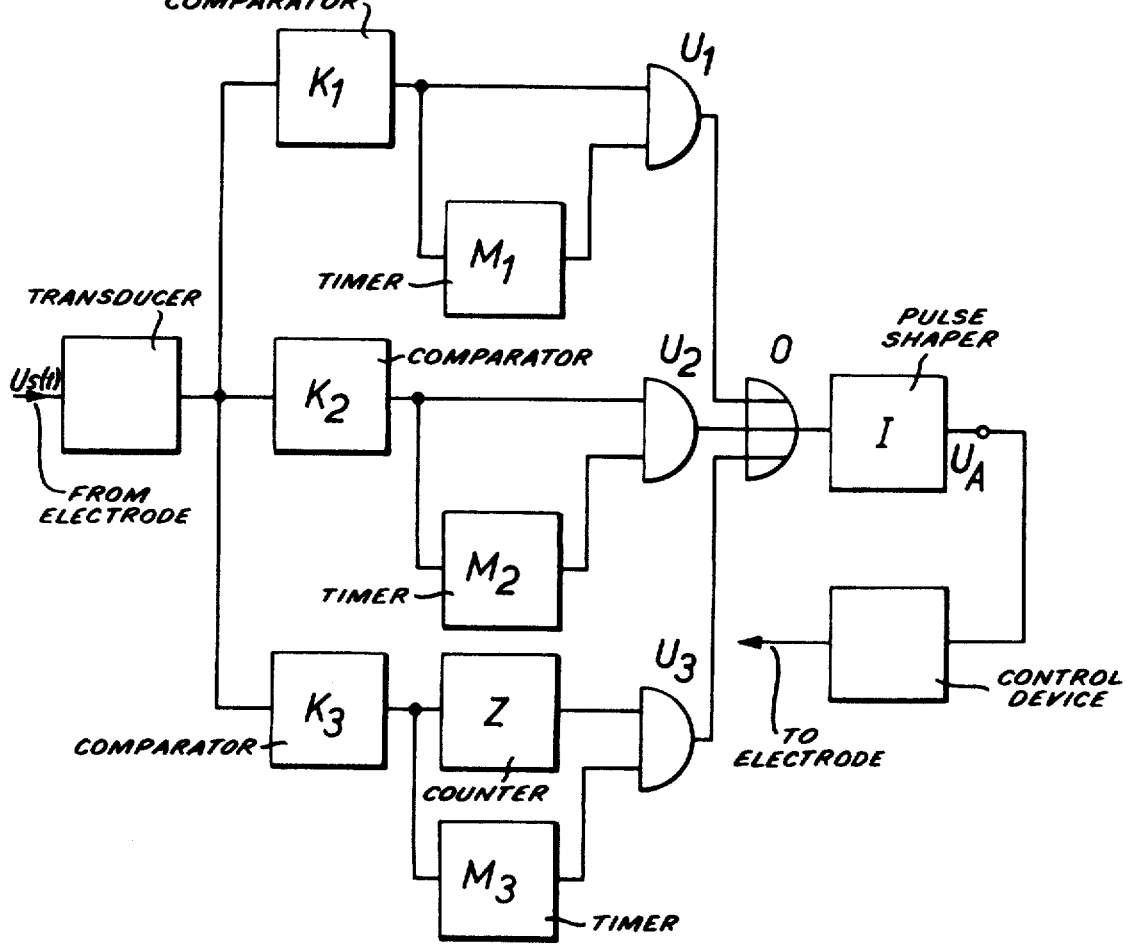
FIG. 3 shows a preferred embodiment of the device for carrying out the method according to the invention.

From the logical combination of the underlined terms (and respectively or) indicated in the foregoing description the logical block diagram of FIG. 3 can be derived. In that case $K_1$, $K_2$ and $K_3$ represent threshold value comparators for the threshold voltages $U_{SCH1}$, $U_{SCH2}$, $U_{SCH3}$. These comparators are preferably obtained by means of Schmitt triggers with adjustable threshold voltages. The welding voltage to be monitored is transmitted to the three comparators. The output of the comparators $K_1$, $K_2$ and $K_3$ is transmitted respectively to the first input of a corresponding AND-gate $U_1$, $U_2$ and $U_3$.

Adjustable time determining units $M_1$, $M_2$ and $M_3$ with selectable time constant serve to cover the above described time intervals. Their input lies at the output of the corresponding comparators $K_1$, $K_2$ respectively $K_3$. Their output is connected to the second input of the corresponding AND-gate $U_1$, $U_2$ or $U_3$.

The OR - combination described above is accomplished by the illustrated OR-gate O. Each of the three inputs of this OR-gate O is connected to the output of a corresponding AND-gate $U_1$, $U_2$ or $U_3$. The output of the OR-gate O is connected to the input of a pulse shaper I, which produces the output signal $U_A$ when an error or defect occurs.

In order to detect the third defect criterion, i.e. the occurrence of "tipping," a pre-selection counter Z is provided between the output of the comparator $K_3$ and the first input of the AND-gate $U_3$. This pre-selection counter can preferably consist of an adjustable binary or decadic counter of bistable relaxation circuits.

In the following a possible adjustment of the control apparatus is given for preferably low-hydrogen electrode welding, with an electrode diameter of 4 mm. Usually, these electrodes are welded with a mean welding voltage of $U_S = +24$ V. In the control apparatus, the threshold value comparator $K_1$ is adjusted to $U_{SCH1} = +10$ V and the monostable multivibrator $M_1$ is adjusted to $T_1 = 30$ ms. The threshold value comparator $K_2$ is adjusted to $U_{SCH2} = +35$ Volt and the monostable multivibrator is adjusted to $T_2 = 5$ ms.

The threshold value comparator $K_3$ is adjusted to $U_{SCH3} = 12V$, the pre-selection counter to the numeral 4 and the monostable multivibrator $M_3$ to $T_3 = 100$ ms.

This produces a defect or error marking with the marking device if:

a. the welding voltage is below $+ 10$ V for 30 ms or b. the welding voltage is higher than $+ 35$ V for 5 ms or c. the welding voltage is four times below $+ 12$ V within 100 ms These defect possibilities are shown in FIGS. 1 and 2 as details A, B and C.

A further embodiment of the control apparatus is described hereafter:

By means of the output signal $U_A$ (defect message) and by using a second information, namely whether the control apparatus has responded to the defect criterion 1, 2 or 3, a regulating or controlling device in the welding set can automatically adjust the error of the machine setting.

The control apparatus can preferably be designed as a portable accessory unit for the various welding sets, wherein the marking device, e.g. in automatic welding processes, is carried at the welding head, in semi-automatic or manual welding processes, at a carriage automatically controlled for example by means of a photoelectric or inductive transmitter.

In the described processes the disturbance message $U_A$ has a minimum duration corresponding to the requirements, or lasts as long as the disturbance occurs. The disturbance message $U_A$ is formed by a pulse shaper I into a rectangular pulse and releases the defect marking with the marking device.

What is claimed is:

1. A method for monitoring, controlling and regulating the course of electric welding processes with a consumable electrode carrying a welding voltage with respect to a work piece, comprising the steps of generating a first adjustable threshold voltage ($U_{SCH1}$), comparing the welding voltage with said first adjustable threshold voltage ($U_{SCH1}$), generating a first signal when the welding voltage is below the first threshold for a time period longer than a first adjustable time $T_1$, generating a second adjustable threshold voltage ($U_{SCH2}$) comparing the welding voltage with said second adjustable threshold voltage ($U_{SCH2}$), generating a second signal when the welding voltage is above said second adjustable threshold voltage for a time period longer than a second independently adjustable time $T_2$, generating a third adjustable threshold voltage ($U_{SCH3}$), generating a third signal when the welding voltage is more than an adjustable number of times below said third adjustable threshold voltage ($U_{SCH3}$) during a time period equal to a third adjustable time $T_3$, and generating an output signal when either one of said first, second or third signals exists.

2. Apparatus for monitoring, controlling and regulating the course of electric welding processes with a consumable electrode carrying a welding voltage with respect to a workpiece, comprising means for generating said welding voltage between said electrode and said workpiece, a transducer for producing a signal commensurate with the welding voltage, a first means ($K_1$) for comparing the welding voltage signal with a first adjustable threshold value ($U_{SCH1}$) and generating a signal when the welding voltage signal is above said first threshold value, first timing means for timing a first period of time of a first adjustable duration, a first AND-gate ($U_1$) having an output terminal and being connected with a first input terminal to said first comparing means and with a second input terminal to said first timing means ($M_1$), a second means for comparing said welding voltage signal with a second adjustable threshold value and generating an output signal when said welding voltage signal is below said second threshold value, second timing means for timing a second period of time of a second adjustable duration, a second AND-gate ($U_2$) having an output and being connected with a first input to said second comparing means and with a second input to said second timing means, a third means for comparing said welding voltage signal with a third adjustable threshold value and generating an output signal when said signal is below said third threshold value, an adjustable pre-selection counter (Z) connected to an output of said third comparing means for counting of the output signals from said third comparing means and generating an output signal when a preselected number is reached, third timing means for timing a third period of time of a third adjustable duration, a third AND-gate ($U_3$) having an output and being connected with a first input to said output of said counter and with a second input to said third timing means, an OR-gate (O) having an output and being respectively connected with its inputs to said outputs of the said AND-gates ($U_1$, $U_2$, $U_3$) and a pulse shaper (I) connected to the output of said OR-gate.

* * * * *